United States Patent [19]

Ball et al.

[11] 4,299,732

[45] Nov. 10, 1981

[54] PROCESS FOR THE PRODUCTION OF AMORPHOUS ALUMINOSILICATES AND THEIR USE AS CATALYSTS

[75] Inventors: William J. Ball, Capel; Keith W. Palmer, Weybridge; David G. Stewart, Epsom, all of England

[73] Assignee: The British Petroleum Company Limited, London, England

[21] Appl. No.: 80,477

[22] Filed: Oct. 1, 1979

[30] Foreign Application Priority Data

Oct. 6, 1978 [GB] United Kingdom ............... 39565/78

[51] Int. Cl.³ .......................... B01J 29/02; B01J 21/12
[52] U.S. Cl. ............................ 252/455 R; 252/431 N; 423/328; 423/329
[58] Field of Search ........... 252/455 R, 455 Z, 431 N; 423/327, 328, 329; 260/448 C

[56] References Cited

U.S. PATENT DOCUMENTS 4,107,195  8/1978  Rollmann .................. 423/329 X
4,139,600  2/1979  Rollmann et al. ............ 423/329

Primary Examiner—Carl F. Dees
Attorney, Agent, or Firm—Brooks, Haidt, Haffner & Delahunty

[57] ABSTRACT

Amorphous aluminosilicates useful as catalysts, particularly for the decomposition of methanol to synthesis gas, are produced by reacting a source of silica, a source of alumina, a source of alkali metal, water and one or more polyamines other than a diamine. A class of effective polyamines is that known as polyethylene poly amines of which triethylene is representative. The catalytic activity of the aluminosilicate may be enhanced in particular by incorporation of the metals copper, zinc, gallium, bismuth, chromium, thorium, iron, cobalt, ruthenium, rhodium, nickel, palladium, iridium or platinum.

11 Claims, No Drawings

PROCESS FOR THE PRODUCTION OF AMORPHOUS ALUMINOSILICATES AND THEIR USE AS CATALYSTS

The present invention relates to a method of preparing novel synthetic amorphous aluminosilicates and their use in catalytic reactions and in particular the catalytic decomposition of methanol to hydrogen and carbon monoxide, which mixture will hereinafter be referred to as synthesis gas.

The production of hydrogen and carbon monoxide by the catalytic decomposition of methanol is indicated by the following reaction:

$$CH_3OH \rightleftharpoons CO + 2H_2$$

Although in the past attention has principally been directed towards converting synthesis gas into products such as methanol, it is now envisaged that there will be a need in the near future to convert methanol into synthesis gas. This is being brought about by the many projects to manufacture methanol on a very large scale in certain favourable locations, eg the Middle East, followed by the transport of methanol in bulk to sites where a ready supply of synthesis gas is required for further processing. Such a scheme is very advantageous, because methanol is a non-corrosive liquid under normal conditions and can consequently be shipped without difficulty or danger over great distances. In addition, there is a growing awareness of the great potential of methanol as a starting material for chemicals production based on carbonylation and hydroformylation reactions, eg in acetic acid and oxo alcohol production.

The decomposition of methanol was studied in the early part of this century, principally because it was considered that the catalyst which gave the maximum decomposition into carbon monoxide and hydrogen would be particularly suitable for the synthesis of methanol from these gases under pressure. [Industrial and Engineering Chemistry 20, (7), page 694, (1928).] Most of these studies were of an academic nature and were mainly concerned with zinc-containing catalysts [eg Journal of Catalysis, 27, page 471, (1972).]

A study directed towards a process for the production of synthesis gas was reported in Industrial and Engineering Chemistry, 40, (4), page 583, (1948). In this, methanol is decomposed to carbon monoxide and hydrogen over a Filtros supported mixture of copper and nickel oxides maintained at a temperature in the range 350° to 400° C. The synthesis gas produced by this method was never more than 97% pure, the by-products being 0.2% carbon dioxide and 2% inerts, including nitrogen and gaseous hydrocarbons. A major disadvantage of this process was the high rate of carbon deposition and because of this the catalyst required frequent regenerations.

More recently we found that a catalyst comprising a supported metal of Group VIII of the Periodic Table either alone or in combination with one or more other metals from Groups I to VIII of the Periodic Table, excluding binary combinations of copper and nickel, particularly a mixture of rhodium and copper supported on silica, can produce synthesis gas in high yield and selectivity. Such a process is described and claimed in our copending application No. 31538/77 (BP Case No. 4430).

We have now found that amorphous aluminosilicates result when a source of silica, a source of alumina, a source of alkali metal, water and a polyamine other than a diamine are reacted, and that the aluminosilicates so-produced are effective catalysts for the decomposition of methanol to synthesis gas. This is unexpected because in general synthetic aluminosilicates which are prepared in the presence of organic nitrogen bases are crystalline and, rather than catalys the decomposition of methanol to synthesis gas, catalyse the conversion of methanol to ethylene and other hydrocarbons. Thus, for example, our copending European application Nos. 7830074.3 (BP Case No. 4625/4509) and 78300773.5 (BP Case No. 4509) describe methods for preparing crystalline aluminosilicates from substituted primary, secondary and tertiary amines, such as the alkanolamines, and their use as catalysts for dehydrating alcohols to hydrocarbons, in particular methanol to $C_2$, $C_3$ and $C_4$ hydrocarbons. In British Pat. No. 1,471,440 the crystalline aluminosilicate, which again is catalytically active in the dehydration of methanol, is derived from a primary amine. All the foregoing relate to aluminosilicates prepared from mono-amines. However Belgian patent specification No. 866270 describes the production of crystalline aluminosilicates using, as the organic nitrogen base, alkyl diamines and European patent application No. 669 describes the production of crystalline aluminosilicates from 7-12C alkylene diamines. Although the crystalline materials so-produced are described as catalysts the reactions catalysed do not include methanol decomposition.

Thus according to the present invention there is provided a process for the production of an amorphous aluminosilicate which process comprises mixing, under reaction conditions which effect formation of the aluminosilicate, a source of silica, a source of alumina, a source of alkali metal, water and one or more polyamines other than a diamine.

Suitable sources of silica include, for example, sodium silicate, silica hydrosol, silica gel, silica sol and silicic acid. The preferred source of silica is an aqueous colloidal dispersion of silica particles. A suitable commercially available source of silica is LUDOX Colloidal Silica marketed by DuPont (LUDOX is a Registered Trade Mark).

Suitable sources of alumina include, for example, sodium aluminate, aluminum sulphate and alumina. The preferred source of alumina is sodium aluminate prepared by dissolving alumina particles in excess sodium hydroxide solution.

Suitable sources of alkali metal include alkali metal hydroxides and alkali metal oxides. Preferably the alkali metal is sodium and the preferred source of alkali metal is sodium hydroxide.

It will be appreciated that each source of silica, alumina and alkali metal can be supplied by one or more initial reactants and then mixed together in any order. For example sodium silicate is a source of both sodium and silica.

A suitable polyamine is a polyethylene polyamine having the formula:

$$H_2N(CH_2CHNH)_{\overline{x}}H \qquad (I)$$
$$\phantom{H_2N(CH_2CH}|$$
$$\phantom{H_2N(CH_2CHNH)_{\overline{x}}}R^1$$

wherein x is an integer greater than 1 and $R^1$ is hydrogen or an organic radical such as, for example, an alkyl group containing from 1 to 6 carbon atoms, a cycloaliphatic group or an aromatic group. Preferably $R^1$ is hydrogen. Examples of suitable polyethylene polyamines are diethylene triamine, triethylene tetramine, tetraethylene pentamine and pentaethylene hexamine. Polyethylene polyamines are commercially available from a number of sources. They may conveniently be prepared by reacting ethylene dichloride or ethylene oxide with ammonia. Mixtures of polyethylene polyamines may also be used in the process of the present invention. Whilst polyethylene polyamines having the formula (I) are linear in structure it is also possible to use the branched isomers, which have the formula:

(II)

wherein x and $R^1$ are as defined hereinbefore for the polyethylene polyamine having the formula (I).

In addition there can be used mixed or higher polyamines having the formula:

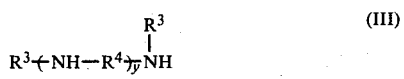
(III)

wherein y=a, b, c ... z, in which a is an integer equal to or greater than 1 and b, c ... z are either zero or integers, $R^3$ is hydrogen or a monovalent organic radical and $R^4$ is a divalent organic radical. $R^3$ and $R^4$ may be aliphatic, cycloaliphatic or aromatic radicals. Thus $R^3$ may suitably be methyl, ethyl, n-propyl or isopropyl and $R^4$ may suitably be methylene, ethylene, propylene or isopropylene.

Suitable compounds falling within the formula (III) are either compounds having the formula:

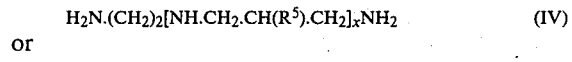
(IV)

or

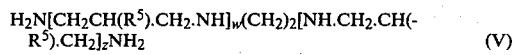
(V)

wherein in the formulae (IV and V) $R^5$ is either a hydrogen atom or a methyl radical and x, w and z are integers in the range 1 to 10. An example of a compound having the formula (IV) is 1-amino-3-(2'-aminoethylamino) propane i.e. $NH_2.(CH_2)_2NH(CH_2)_3NH_2$ deriving from the substitution of $R^5$=a hydrogen atom and x=1 in the formula (IV). An example of a compound having the formula (V) is Bis[1,2-(3'-aminopropylamino] ethane ie $H_2N[CH_2CH_2CH_2NH](CH_2)_2[NH\ CH_2CH_2CH_2]NH_2$ deriving from the substitution of R=a hydrogen atom and w and z=1 in the formula (V). Amino compounds of formula (IV) in which x is equal to one may be prepared by the process comprising reacting ethylene diamine with either acrylonitrile or methacrylonitrile to produce an intermediate nitrile group-containing amino compound and thereafter hydrogenating the intermediate compound, suitably in the presence of a hydrogenation catalyst, thereby converting the nitrile group to an amino group. This sequence of steps may be repeated (x-1) times, each time increasing the chain length of the compound so-produced by $-NH.CH_2.CH(R).CH_2-$. Compounds having the formula (V) may be prepared in a similar manner.

Conditions which effect the formation of the aluminosilicate may be, for example, a temperature in the range from 80° to 210° C., preferably from 135° to 190° C., and a pressure in the range from 70 to 400 psig, preferably from 100 to 250 psig. The mixture may suitably be held under these conditions for a time not less than 4 hours, preferably from 20 to 100 hours.

The sources of silica, alumina and alkali metal, water and the polyamine or mixture thereof may be mixed in quite wide proportions. Thus the ratio of the silica source to the alumina source may be in the range from 10:1 to 150:1, preferably from 15:1 to 100:1 based on the equivalent moles of silica and alumina in the respective sources. The alkali metal source may be present in an amount of from 50 to 0.02, preferably from 10 to 0.1 moles of alkali metal per mole equivalent of total silica and alumina in the respective sources. The polyamine or mixture thereof may suitably be present in an amount from 50 to 0.02, preferably from 10 to 0.1 moles per mole equivalent of total silica and alumina in the respective sources. The amount of water is not critical to the performance of the invention, provided sufficient is present to carry out the reaction.

The reaction is suitably carried out in a closed vessel capable of withstanding the elevated pressures generally employed during the process. Furthermore the reaction mixture is preferably agitated during the formation of the aluminosilicate. The solid aluminosilicate so-prepared may be filtered off and washed with water at a temperature in the range, for example, of from 15° to 95° C.

Aluminosilicates prepared by the process of the invention are amorphous and are usually characterised by a relatively high silica to alumina ratio, ie $SiO_2:Al_2O_3 \geq 10$. The alkali metal present in the aluminosilicate may be exchanged using conventional techniques with one or more other metal cations. Alternatively the alkali metal may be exchanged to give the H-form of the aluminosilicate. As hereinbefore mentioned the amorphous aluminosilicates may be used in catalytic reactions and in particular as catalysts in the production of synthesis gas from methanol.

Thus according to another aspect of the present invention there is provided a process for the production of synthesis gas from methanol which process comprises contacting methanol in the vapor phase at elevated temperature and pressure with a catalyst comprising an amorphous aluminosilicate prepared by the process as hereinbefore described.

Methanol is available commercially on a very large scale and using the process of the invention it can be readily converted into a stream of synthesis gas for further down-stream processing. The methanol may be anhydrous or it may contain water up to, for example, 90% w/w. Alternatively water may be introduced as a separate feed in the form of steam. Furthermore the methanol may be diluted with carbon monoxide, carbon dioxide or recycled synthesis gas. Since the decomposition of methanol is endothermic the use of diluents offers a convenient method for introducing heat into the reaction.

The amorphous aluminosilicate may be further admixed with other materials, such as silica, alumina, titania, zirconia and zeolites, both natural and synthetic, if so desired. Furthermore its catalytic activity may be enhanced by the addition of certain metals. Metals which may advantageously be incorporated in the catalyst include one or more metals belonging to Groups IB, IIB, IIIA, VA, VIB or VIII of the Periodic Table of Elements as published in the Handbook of Chemistry and Physics. Of these metals, copper, zinc, gallium, bismuth, chromium, thorium, iron, cobalt, ruthenium, rhodium, nickel, palladium, iridium and platinum are preferred. The catalyst may be prepared by impregnating the support with a solution of a compound of the metal in a suitable solvent, such as water, and thereafter removing the solvent. The catalyst may also be prepared by methods well-known to those skilled in the art, for example by precipitation from solutions of the metal salts, exchange or by mere admixture. The supported metal catalyst may suitably contain from 0.1 to 20%, preferably from 0.2 to 10% by weight of the metal or metals.

It is preferred to activate the synthetic aluminosilicate or the metal-containing aluminosilicate prior to using it as a catalyst. This may suitably be achieved by heating in air at a temperature in the range 400° to 700° C. for a period of from 2 to 48 hours.

It will be appreciated that although the catalyst may be introduced into the reaction zone as a supported metal compound or mixture of metal compounds, under the conditions pertaining during the course of the reaction such compounds may well be chemically reduced. In such circumstances the precise chemical nature of the catalyst at any time during the reaction is not known with any degree of certainty, with the result that the catalyst can only be characterised by reference to the metals it contains.

Methanol may suitably be contacted with the catalyst at a temperature in the range 200 to 600, preferably 300° to 450° C. and at a pressure up to 100, preferably from 1 to 50 atmospheres. Since the decomposition of methanol is equilibrium limited it is preferred to employ high temperatures in combination with high pressures.

The process may be operated batchwise or continuously, continuous operation being preferred. The contact time, as hereinafter defined, for continuous operation may be up to 30, preferably from 1 to 5 seconds. For the purpose of this specification the contact time is defined as follows:

$$\frac{\text{Volume of catalyst in milliliters}}{\text{Total volume of gas (in milliliters/second at } NTP)}$$

The catalyst may be used either as a fixed bed or as a fluidised bed.

The decomposition of methanol produces 2 volumes of hydrogen for every volume of carbon monoxide. This ratio can be altered if so desired by treating the hydrogen/carbon monoxide mixture in a manner well-known to those skilled in the art ie by the so-called "shift reaction".

The mixtures of hydrogen and carbon monoxide produced by the process hereinbefore described or the hydrogen or carbon monoxide produced by subsequent treatment of the product mixture may be used in a variety of chemical reactions, including carbonylation, hydrocarbonylation and chemical reduction.

The invention will now be illustrated by reference to the following Examples. In the Examples reference will be made to the molar yield of a particular product. This is defined as follows:

Molar yield of a particular product =

$$\frac{\text{Moles of methanol converted to a particular product}}{\text{Moles of methanol fed}} \times 100$$

Preparation of aluminosilicate

Example 1

0.85 g alumina (Laporte Type A) was dissolved in a hot solution of 1.3 g sodium hydroxide dissolved in 12.5 ml deionised water. This solution was then added to a mixture of 50 g Ludox colloidal silica (containing 30% silica) in a solution of 12.5 g triethylenetetramine in 37.5 ml deionised water.

This mixture was then placed in a revolving stainless steel pressure vessel and heated at 170° C. for 60 hours. The resultant solid was filtered off and the filter-cake suspended in an aqueous solution of ammonia (100 ml '910' ammonia solution/100 ml deionised water) and stirred for one hour. The mixture was filtered and the solid washed with 200 ml deionised water before drying at 120° C. for 16 hours.

The aluminosilicate so-produced was shown to be amorphous by X-ray examination and the alumina:silica ratio was 1:22.

EXAMPLE 2

1.7 g alumina (Laporte Type A) was dissolved in a hot solution of 2.6 g sodium hydroxide dissolved in 25 ml deionised water. This solution was then added to a mixture of 50 g Ludox colloidal silica (containing 30% silica) in a solution of 25 g triethylenetetramine in 75 ml deionised water.

This mixture was then placed in a revolving stainless steel pressure vessel and heated at 170° C. for 66 hours. The mixture was filtered and the solid washed with 200 ml deionised water before drying at 120° C. for 16 hours.

The aluminosilicate so-produced was shown to be amorphous by X-ray examination.

Comparison Test 1

1.4 g alumina (Laporte Type A) was dissolved in a hot solution of 2 g sodium hydroxide dissolved in 20 ml deionised water. This solution was then added with stirring to 100 g Ludox colloidal silica (containing 30% silica) and 100 ml deionised water. The resultant mixture was then placed in a revolving stainless steel pressure vessel and heated at 170° C. for 80 hours. The solid produced thereby was filtered off and the filter-cake suspended in an aqueous solution of ammonia (100 ml '910' ammonia solution/100 ml deionised water) and stirred for one hour. The mixture was filtered and the solid washed with 300 ml deionised water before drying at 120° C. for 16 hours.

This is not an example of the process of the present invention because the polyamine was omitted from the preparation.

Preparation of metal-loaded catalyst

Example 3

0.57 g copper nitrate, $(Cu(NO_3)_2 \cdot 3H_2O)$, was dissolved in 10 ml deionised water and the resulting solution was added to a slurry of 3 g of the aluminosilicate prepared as described in Example 1 and 3 g Ludox colloidal silica (containing 30% silica). The mixture was evaporated to dryness on a steam-bath, dried at 120° C.

and the dry-cake broken down to give 5–16 mesh (BSS) granules.

Use of the synthetic aluminosilicates as catalysts for the decomposition of methanol

Example 4

The synthetic aluminosilicate product from Example 1 was crushed to pass 5–10 mesh (BSS) and was then activated by heating in air at 500° C.

A gaseous feed of methanol was passed over the activated aluminosilicate in a glass reactor at 450° C. and atmospheric pressure. The contact time was 3.5 seconds.

The molar yields of carbon monoxide, methane, carbon dioxide and dimethylether, based on the total methanol fed, were respectively 85.4%, 6.3%, 0.8% and 4.9%.

The hydrogen to carbon monoxide ratio of the synthesis gas obtained was 2:1.

Carbon monoxide, methane and carbon dioxide were analysed by gas chromatography using a thermal conductivity detector and hydrogen was determined by difference.

EXAMPLE 5

The synthetic aluminosilicate product from Example 2 was crushed to give 5–16 mesh (BSS) granules and was then activated by heating in air at 500° C.

A gaseous feed of methanol was passed over the activated aluminosilicate in a glass reactor at 450° C. and atmospheric pressure. The contact time was 1.4 seconds.

The molar yields of carbon monoxide, methane carbon dioxide and recovered methanol/dimethyl ether, based on the total methanol fed, were 22, 3, trace and 75% respectively.

The hydrogen to carbon monoxide ratio of the synthesis gas obtained was 1.8:1.

Carbon monoxide, methane and carbon dioxide were analysed by gas chromatography using a thermal conductivity detector and hydrogen was determined by difference.

Use of the metal-loaded aluminosilicate as catalyst for the decomposition of methanol

Example 6

The catalyst prepared as described in Example 3 was activated by heating in air at 500° C.

A gaseous feed of methanol was passed over the activated catalyst in a glass reactor at 400° C. and atmospheric pressure. The contact time was 2.2 seconds.

The molar yields of carbon monoxide and recovered methanol/dimethyl ether, based on the total methanol fed were 97 and 3% respectively.

The hydrogen to carbon monoxide ratio of the synthesis gas obtained was 2:1.

Carbon monoxide was determined by gas chromatography using a thermal conductivity detector and hydrogen was determined by difference.

Comparison Test 2

The synthetic aluminosilicate product of Comparison Test 1 was crushed to pass 5–10 mesh (BSS) and activated by heating in air at 500° C. for 16 hours.

A gaseous feed of methanol was passed over the activated aluminosilicate in a glass reactor at between 400° and 500° C. and atmospheric pressure. The contact time was 2.5 seconds. The product was mainly unreacted methanol and small amounts of dimethyl ether.

This is not an example according to the present invention and is included only for the purpose of comparison.

The effect of adding steam to the methanol feed

Example 7

A synthetic aluminosilicate prepared as described in Example 1 was crushed to pass 5–10 mesh (BSS) and was then activated by heating in air at 500° C.

A gaseous feed of methanol (45% by volume) and steam (55% by volume) was passed over the activated aluminosilicate in a glass reactor at 448° C. and atmospheric pressure. The contact time was 1.2 seconds.

The molar yields of carbon monoxide, carbon dioxide and dimethylether, based on the total methanol fed, were respectively 18.4%, 0.2% and 1.2%. Of the methanol fed 80% was recovered unchanged. The hydrogen to carbon monoxide ratio of the synthesis gas obtained was 2:1.

We claim:

1. A process for the production of an amorphous aluminosilicate which process comprises mixing, under reaction conditions which effect formation of said aluminosilicate, a source of silica, a source of alumina, a source of alkali metal, water and one or more polyamines other than a diamine.

2. A process according to claim 1 wherein said polyamine is selected from polyethylene polyamines having the formula:

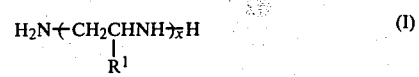

wherein x is an integer greater than 1 and $R^1$ is selected from hydrogen, alkyl groups containing from 1 to 6 carbon atoms, cycloaliphatic groups and aromatic groups.

3. A process according to claim 2 wherein $R^1$ in said polyethylene polyamine having the formula (I) is hydrogen.

4. A process according to claim 1 wherein said polyamine is triethylene tetramine.

5. A process according to claim 1 wherein said polyamine has the formula:

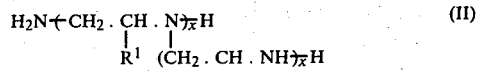

wherein x is an integer greater than 1 and $R^1$ is selected from hydrogen, alkyl groups containing from 1 to 6 carbon atoms, cycloaliphatic groups and aromatic groups.

6. A process according to claim 1 wherein said polyamine has the formula:

wherein y=a, b, c ... z, in which a is an integer greater than 1 and b, c ... z are either zero or integers, $R^3$ is hydrogen or a monovalent organic radical and $R^4$ is a divalent organic radical.

7. A process according to claim 1 wherein said polyamine has the formula:

$$H_2N.(CH_2)_2[NH.CH_2.CH(R^5).CH_2]_xNH_2 \qquad (IV)$$

wherein $R^5$ is either a hydrogen atom or a methyl radical and x is an integer having a value in the range 1 to 10.

8. A process according to claim 1 wherein said polyamine has the formula:

$$H_2N[CH_2.CH.(R^5).CH_2NH]_w(CH_2)_2[NH.CH_2.CH\text{-}(R^5).CH_2]_zNH_2 \qquad (V)$$

wherein $R^5$ is either a hydrogen atom or a methyl radical and w and z are integers in the range 1 to 10.

9. A process according to claim 1 wherein said conditions which effect formation of said aluminosilicate are a temperature in the range 80° to 210° C., a pressure in the range 70 to 400 psig and a reaction time in the range 20 to 100 hours.

10. A process according to claim 1 wherein in said mixture the ratio of said silica source to said alumina source is in the range from 10:1 to 150:1 based on the equivalent moles of silica and alumina in the respective sources, said alkali metal source is present in an amount of from 50 to 0.02 moles of alkali metal per mole equivalent of total silica and alumina in the respective sources and said polyamine is present in an amount from 50 to 0.02 moles per mole equivalent of total silica and alumina in the respective sources.

11. A catalyst composition suitable for use in the production of synthesis gas from methanol which composition consists of an amorphous aluminosilicate as produced by the process claimed in claim 1 and from 0.1 to 20% by weight of at least one metal selected from copper, zinc, gallium, bismuth, chromium, thorium, iron, cobalt, ruthenium, rhodium, nickel, palladium, iridium and platinum.

* * * * *